(12) United States Patent
Chen et al.

(10) Patent No.: US 9,860,825 B2
(45) Date of Patent: Jan. 2, 2018

(54) MOBILE HARDWARE IDENTITY IN AN ENVIRONMENT WITH MULTIPLE RADIO ACCESS NETWORKS

(71) Applicant: Verizon Patent and Licensing Inc., Arlington, VA (US)

(72) Inventors: Xuming Chen, San Ramon, CA (US); Imtiyaz Shaikh, Irving, TX (US); Mingxing S. Li, San Jose, CA (US); Chien-Yuan Huang, Basking Ridge, NJ (US); William C. King, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 295 days.

(21) Appl. No.: 14/578,658

(22) Filed: Dec. 22, 2014

(65) Prior Publication Data

US 2016/0183166 A1   Jun. 23, 2016

(51) Int. Cl.

| | |
|---|---|
| H04W 4/00 | (2009.01) |
| H04W 48/08 | (2009.01) |
| H04W 12/08 | (2009.01) |
| H04W 4/22 | (2009.01) |
| H04W 48/02 | (2009.01) |
| H04W 60/00 | (2009.01) |
| H04W 8/22 | (2009.01) |
| H04W 12/06 | (2009.01) |
| H04W 76/00 | (2009.01) |
| H04W 88/06 | (2009.01) |
| H04W 12/12 | (2009.01) |
| H04W 76/02 | (2009.01) |

(52) U.S. Cl.
CPC ............. *H04W 48/08* (2013.01); *H04W 4/22* (2013.01); *H04W 8/22* (2013.01); *H04W 12/08* (2013.01); *H04W 48/02* (2013.01); *H04W 60/00* (2013.01); *H04W 12/06* (2013.01); *H04W 12/12* (2013.01); *H04W 76/007* (2013.01); *H04W 76/026* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,594,628 B1 * | 11/2013 | Schroeder | H04L 63/0846 370/331 |
| 2009/0047924 A1 * | 2/2009 | Ray | H04M 3/5116 455/404.2 |

(Continued)

*Primary Examiner* — Charles Appiah
*Assistant Examiner* — Alexander Yi

(57) ABSTRACT

A device may receive, from a mobile device and via a first radio access network, a request for a service. The device may receive a mobile device identifier that identifies the mobile device on a second radio access network. The second radio access network may be a different type of radio access network than the first radio access network. The device may provide the mobile device identifier to an equipment identity register. The device may receive, from the equipment identity register, an authentication indicator that indicates whether to permit or deny access to the service by the mobile device and via the first radio access network. The device may selectively permit or deny the mobile device access to the service, via the first radio access network, based on the authentication indicator.

20 Claims, 9 Drawing Sheets

(56) References Cited

U.S. PATENT DOCUMENTS

| | | | | |
|---|---|---|---|---|
| 2009/0061863 A1* | 3/2009 | Huggett | ................ | H04L 63/101 455/434 |
| 2012/0150742 A1* | 6/2012 | Poon | ...................... | G06Q 20/20 705/44 |
| 2013/0267166 A1* | 10/2013 | Gu | ........................ | H04W 12/06 455/39 |

* cited by examiner

MOBILE HARDWARE IDENTITY IN AN ENVIRONMENT WITH MULTIPLE RADIO ACCESS NETWORKS

BACKGROUND

A mobile device may be identified by a mobile device identifier. A network operator may wish to provide access to a service based on authentication of the mobile device identifier or an identity of a user of the mobile device.

DETAILED DESCRIPTION OF PREFERRED EMBODIMENTS

The following detailed description of example implementations refers to the accompanying drawings. The same reference numbers in different drawings may identify the same or similar elements.

A first type of radio access network, such as a cellular network, may use a mobile device identifier to determine whether to permit or deny a mobile device access to a network service provided via the first type of radio access network. When the mobile device attempts to access the network service via a second type of radio access network, such as a WiFi network, the second type of radio access network may not be capable or recognizing or using the mobile device identifier. A network operator may want to be able to recognize the mobile device on the second type of radio access network, for example, to provide emergency services (e.g., Enhanced 911 (E911) services), to prevent lost or stolen mobile devices from accessing a service, or the like. Implementations described herein may assist a network operator in using the same mobile device identifier across multiple, different types of radio access networks.

Figure 1:
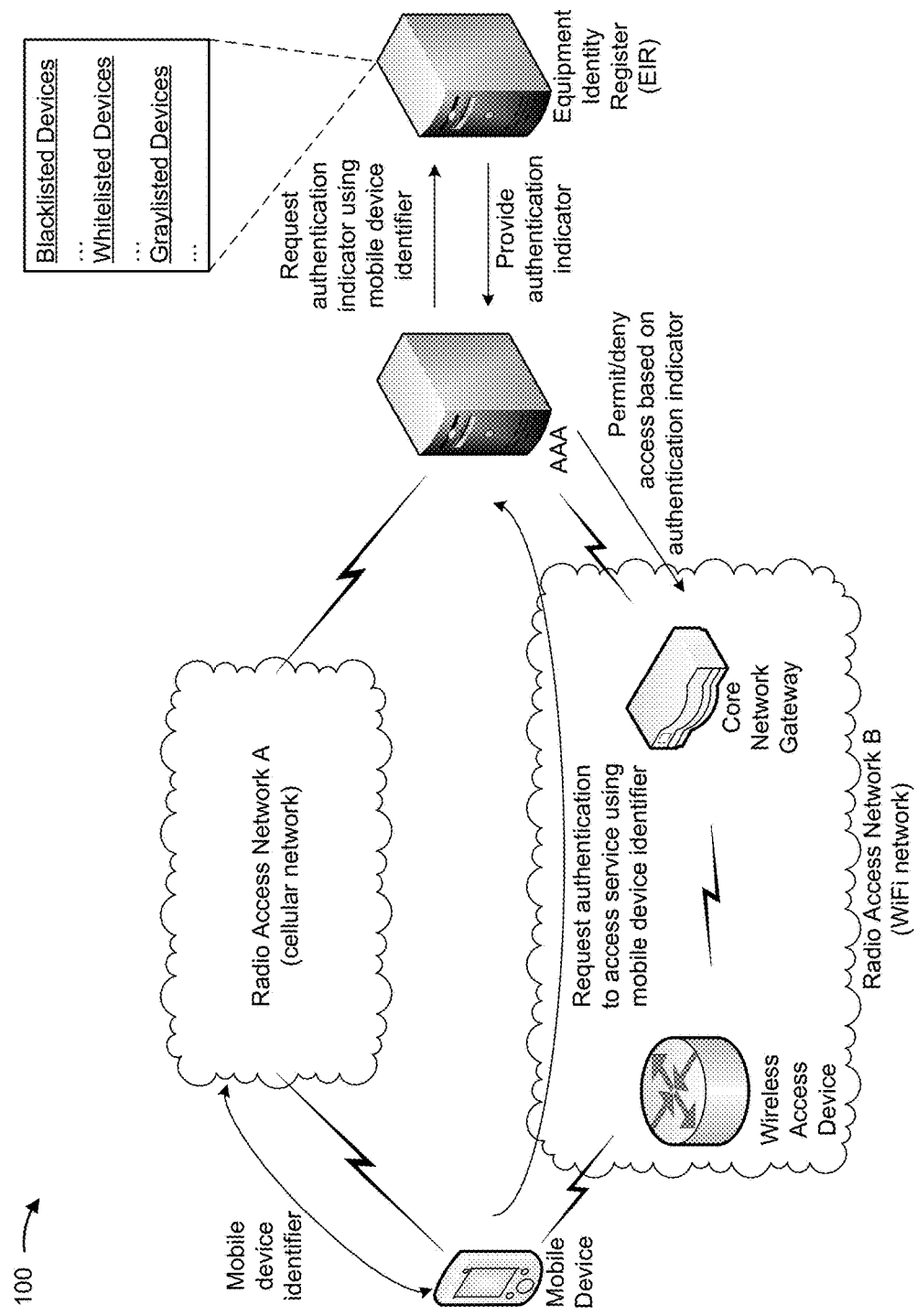
FIG. 1 is a diagram of an overview of an example implementation described herein.

FIG. 1 is a diagram of an overview of an example implementation 100 described herein. As shown in FIG. 1, a mobile device may communicate via a first radio access network, shown as radio access network A. Assume that radio access network A is a cellular network (e.g., a third generation network, a fourth generation network, a long term evolution network, or a similar network). The mobile device may be identified by network devices in radio access network A using a mobile device identifier (e.g., an international mobile station equipment identity (IMEI), an international mobile subscriber identity (IMSI), a mobile directory number (MDN), etc.). For example, network devices of radio access network A (e.g., a base station, a mobility management entity (MME), a home subscriber server device (HSS), an authentication, authorization, and accounting (AAA) device, etc.) may use the mobile device identifier to register the mobile device on radio access network A, to authenticate the mobile device on radio access network A (e.g., to determine whether to permit or deny access to a service via radio access network A), to record accounting and/or billing information associated with the mobile device when using radio access network A, or the like.

As further shown in FIG. 1, the mobile device may communicate via a second radio access network, shown as radio access network B. Assume that radio access network B is a local area network (e.g., a WiFi network, or a similar local area network). The mobile device may attempt to access a service via radio access network B. Before accessing the service, the mobile device may be authenticated using the mobile device identifier used to identify the mobile device on radio access network A. For example, the mobile device may provide the authentication request, via radio access network B, to a core network gateway (e.g., a gateway, or a similar network device). The core network gateway may provide the authentication request and the mobile device identifier to the AAA device.

The AAA device may request, from an equipment identity register (EIR), an authentication indicator that indicates whether the mobile device is permitted to access a service associated with the authentication request. For example, the AAA device may provide the mobile device identifier to the EIR. The EIR may use the mobile device identifier to identify the authentication indicator. For example, the EIR may store an authentication indicator associated with the mobile device identifier (e.g., indicating that the mobile device identifier is on a black list, a grey list, a white list, etc.). The EIR may identify the authentication indicator using the mobile device identifier, and may provide the authentication indicator to the AAA device.

The AAA device may instruct the core network gateway to permit or deny the mobile device access to the service, via radio access network B, based on the authentication indicator. In this way, a network operator may control access to services over radio access network B, using a mobile device identifier that is typically used to identify a device over radio access network A. This may assist in providing certain services, such as emergency services, lost or stolen device reporting, or the like, over a local area network (e.g., a WiFi network).

While the following description focuses on a cellular access network and a WiFi access network, implementations described are not limited to these types of networks. In some implementations, access network 210 may be a different type of network, such as a radio access network, a wireless local access network, a wide area network, a metropolitan area network, a wired network, or another type of network.

Figure 2:
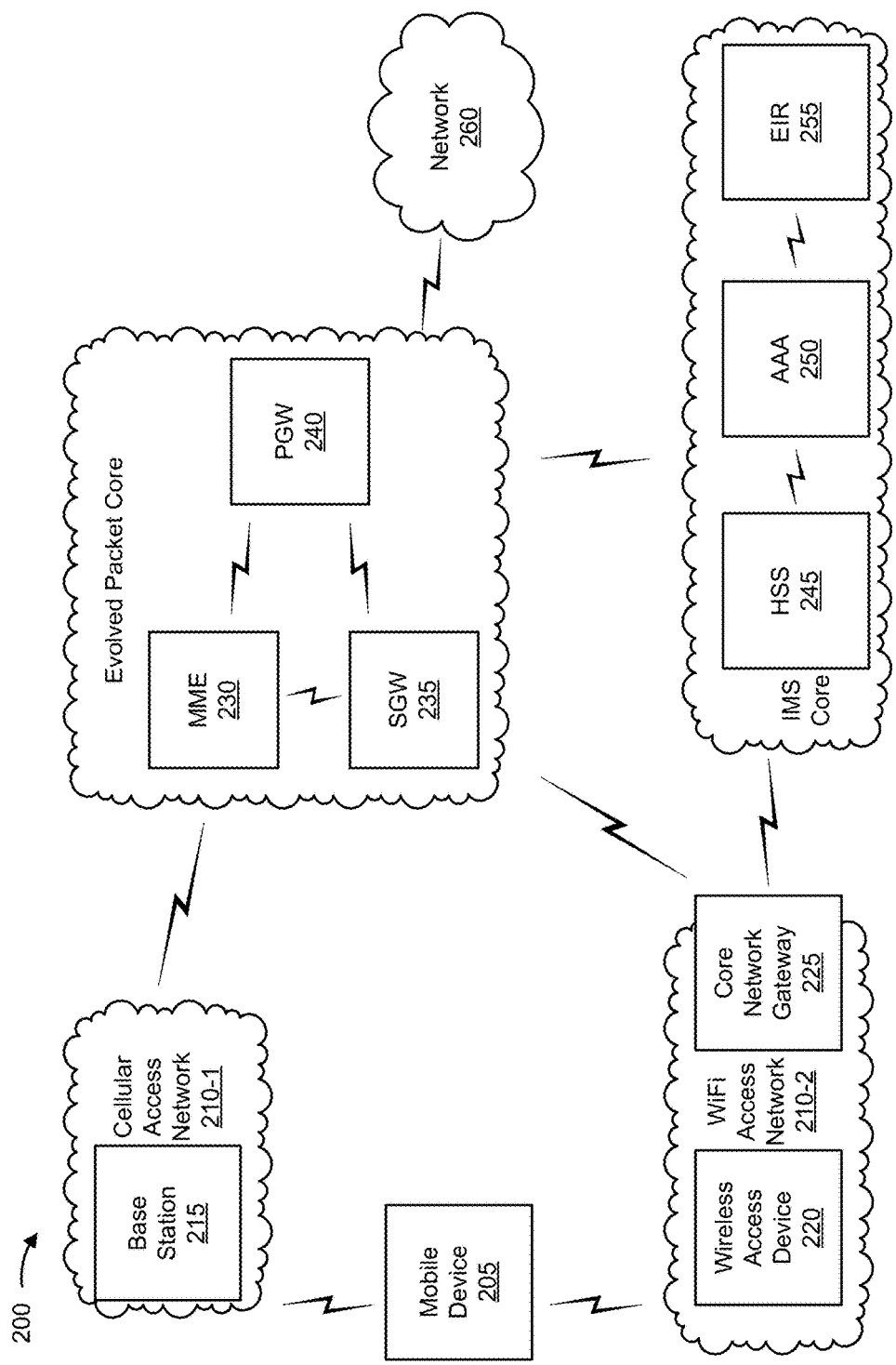
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205, a set of access networks 210-1 to 210-N (N≥1) (hereinafter referred to collectively as "access networks 210," and individually as "access network 210"), a base station 215, a wireless access device 220, a core network gateway 225, a mobility management entity device 230, a serving gateway (SGW) 235, a packet data network gateway (PGW) 240, a home subscriber server 245, an AAA device 250, an equipment identity register (EIR) 255, and a network 260. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

As shown in FIG. 2, environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 215 that take the form of evolved Node Bs (eNBs) via which mobile device 205 communicates with the EPC. The EPC may include MME 230, SGW 235, and/or PGW 240 that enable mobile device 205 to communicate with network 260 and/or an Internet protocol (IP) multimedia subsystem (IMS) core. The IMS core may include HSS 245, AAA 250, and/or EIR 255, and may manage device registration and authentication, session initiation, etc., associated with mobile device 205. HSS 245, AAA 250, and/or EIR 255 may reside in the EPC and/or the IMS core.

Mobile device 205 may include one or more devices capable of communicating with base station 215 and/or wireless access device 220. For example, mobile device 205 may include a device, such as a mobile phone (e.g., a smart phone, a radiotelephone, etc.), a laptop computer, a tablet computer, a handheld computer, a gaming device, a wearable communication device (e.g., a wristwatch with communication capabilities, a pair of eyeglasses with communication capabilities, etc.), or a similar type of device. Mobile device 205 may send traffic to and/or receive traffic from network 260 (e.g., via base station 215 and/or wireless access device 220).

Access network 210 may include one or more networks capable of connecting mobile device 205 with a core network (e.g., an evolved packet core, an IMS core, or the like). For example, access network 210 may include a cellular network (e.g., an LTE network, a 4G network, a 3G network, a code division multiple access (CDMA) network, etc.), a public land mobile network (PLMN), a local area network (LAN), a wireless local area network (WLAN), such as a WiFi network, a wide area network (WAN), a metropolitan area network (MAN), a private network, an ad hoc network, a fiber optic-based network, or the like, and/or a combination of these or other types of networks.

Base station 215 may include one or more devices capable of communicating with mobile device 205 using a cellular radio access technology. For example, base station 215 may include a base transceiver station, a radio base station, a node B, an evolved node B (eNB), a base station subsystem, a cellular tower (e.g., a cell phone tower, a mobile phone tower, etc.), a radio access node, or a similar type of device. Base station 215 may transfer traffic between mobile device 205 and network 260.

Wireless access device 220 may include one or more devices (e.g., one or more traffic transfer devices) capable of processing and/or transferring traffic between mobile device 205 and core network gateway 225. For example, wireless access device 220 may include a router, a gateway, a switch, a hub, a bridge, or a similar device. Wireless access device 220 may be associated with WiFi access network 210-2, and may provide a mobile device identifier, associated with cellular access network 210-1, to core network gateway 225. In some implementations, wireless access device 220 may use a WiFi radio access technology to communicate with mobile device 205.

Core network gateway 225 may include one or more devices (e.g., one or more traffic transfer devices) capable of processing and/or transferring traffic between wireless access device 220 and a core network (e.g., an evolved packet core, an IMS core, or the like). For example, core network gateway 225 may include a firewall, a gateway, a switch, a hub, a bridge, a reverse proxy, a server (e.g., a proxy server), a security device, an intrusion detection device, a load balancer, or a similar device.

MME 230 may include one or more devices, such as one or more server devices, capable of managing authentication, activation, deactivation, and mobility functions associated with mobile device 205. In some implementations, MME 230 may perform operations relating to authentication of mobile device 205. MME 230 may perform operations associated with handing off mobile device 205 from a first base station 215 to a second base station 215 when mobile device 205 is transitioning from a first cell associated with the first base station 215 to a second cell associated with the second base station 215. In some implementations, MME 230 may provide a mobile device identifier to HSS 245 via an S6a interface. The S6a interface may be an interface used to communicate authentication and/or location information between MME 230 and HSS 245.

SGW 235 may include one or more devices capable of routing traffic. For example, SGW 235 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 235 may aggregate traffic received from one or more base stations 215, and may send the aggregated traffic to network 260 (e.g., via PGW 240) and/or other network devices associated with the EPC and/or the IMS core. SGW 235 may also receive traffic from network 260 and/or other network devices, and may send the received traffic to mobile device 205 via base station 215. Additionally, or alternatively, SGW 235 may perform operations associated with handing off mobile device 205 to and/or from access network 210 (e.g., an LTE network).

PGW 240 may include one or more devices capable of providing connectivity for mobile device 205 to external packet data networks. For example, PGW 240 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 240 may aggregate traffic received from one or more SGWs 235, and may send the aggregated traffic to network 260. Additionally, or alternatively, PGW 240 may receive traffic from network 260, and may send the traffic to mobile device 205 via SGW 235 and base station 215.

HSS 245 may include one or more devices, such as one or more server devices, capable of managing (e.g., receiving, generating, storing, processing, and/or providing) information associated with mobile device 205. For example, HSS 245 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 245 may provide this information to one or more other devices of environment 200 to support the operations performed by those devices. In some implementations, HSS 245 may provide a mobile device identifier to AAA 250 through an SWx interface. The SWx interface may be an interface used to communicate authentication information, and mobile device information, such as a mobile device identifier, between HSS 245 and AAA 250.

AAA 250 may include one or more devices, such as one or more server devices, that perform authentication, authorization, and/or accounting operations for communication sessions associated with mobile device 205. For example, AAA 250 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations. In some implementations, AAA 250 may use an S13 interface for authentication purposes. The S13 interface may include an interface used to communicate authentication information between AAA 250 and EIR 255.

EIR 255 may include one or more devices, such as one or more server devices, capable of managing (e.g., receiving, generating, storing, processing, and/or providing) information associated with mobile device identifiers. For example, EIR 255 may manage a list of mobile device identifiers that are associated with lost or stolen mobile devices 205, and/or a list of mobile device identifiers that are associated with mobile devices 205 permitted to access the network. EIR 255 may provide this information to one or more other devices of environment 200 to support the operations performed by those devices.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
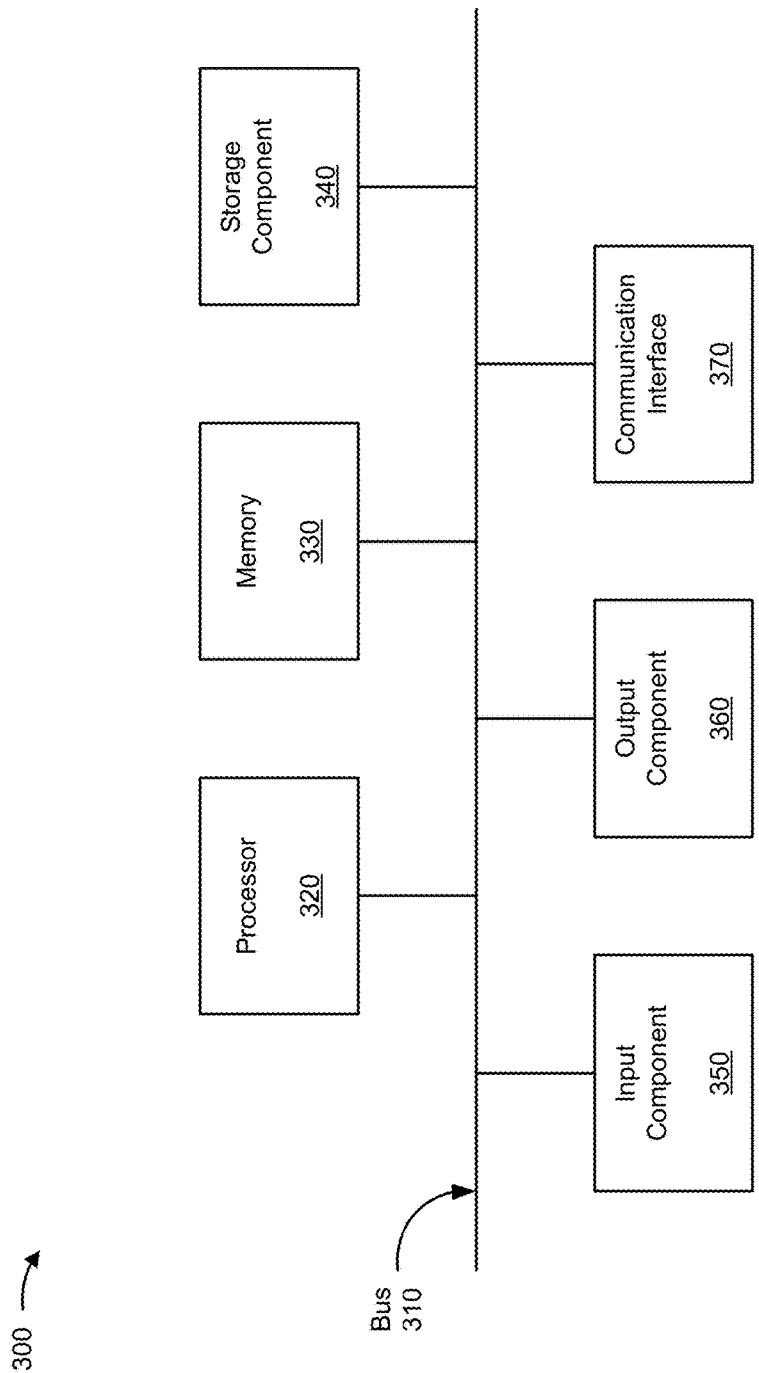
FIG. 3 is a diagram of example components of one or more devices of FIG. 2.

FIG. 3 is a diagram of example components of a device 300. Device 300 may correspond to mobile device 205, base station 215, wireless access device 220, core network gateway 225, MME 230, SGW 235, PGW 240, HSS 245, AAA 250, and/or EIR 255. In some implementations, mobile device 205, base station 215, wireless access device 220, core network gateway 225, MME 230, SGW 235, PGW 240, HSS 245, AAA 250, and/or EIR 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
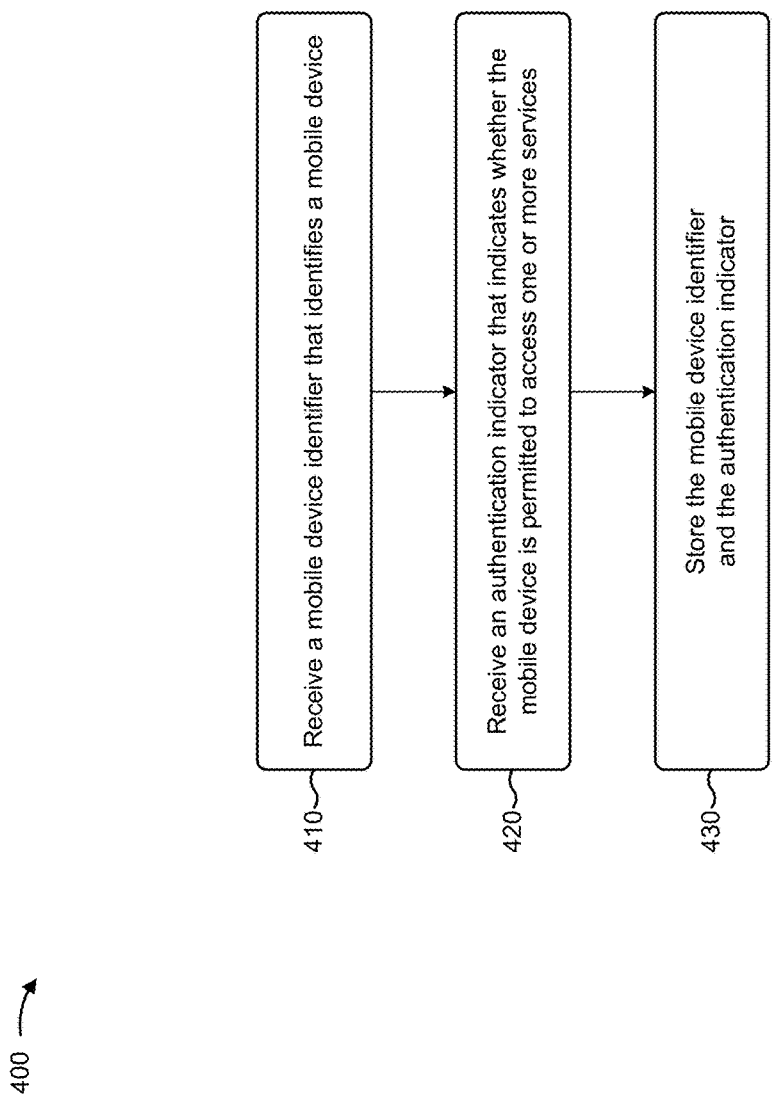
FIG. 4 is a flow chart of an example process for receiving and storing a mobile device identifier and an authentication indicator.

FIG. 4 is a flow chart of an example process 400 for receiving and storing a mobile device identifier and an authentication information indicator. In some implementations, one or more process blocks of FIG. 4 may be performed by EIR 255. In some implementations, one or more process blocks of FIG. 4 may be performed by another device or a group of devices separate from or including EIR 255, such as base station 215, wireless access device 220, core network gateway 225, MME 230, SGW 235, PGW 240, HSS 245, and/or AAA 250.

As shown in FIG. 4, process 400 may include receiving a mobile device identifier that identifies a mobile device (block 410). For example, EIR 255 may receive a mobile device identifier that identifies mobile device 205. In some implementations, the mobile device identifier may include an international mobile station equipment identity (IMEI), a mobile equipment identifier (MEID), an electronic serial number (ESN), an international mobile subscriber identity (IMSI), a mobile directory number (MDN), a serial number, a subscriber identity module (SIM) identity, or a similar identifier. In some implementations, the mobile device identifier may be used to identify mobile device 205 on a cellular network (e.g., a 3G network, a 4G network, an LTE network, or the like).

In some implementations, EIR 255 may receive the mobile device identifier via cellular access network 210-1 (e.g., from base station 215, MME 230, PGW 240, HSS 245, AAA 250, or a similar device). Additionally, or alternatively, EIR 255 may receive the mobile device identifier when mobile device 205 is registered on cellular access network 210-1. In some implementations, EIR 255 may receive the mobile device identifier in other ways.

As further shown in FIG. 4, process 400 may include receiving an authentication indicator that indicates whether the mobile device is permitted to access one or more services (block 420). For example, EIR 255 may receive an authentication indicator from a network administrator device, mobile device 205, a service provider device, or a similar device, that indicates whether mobile device 205 is permitted to access network 260. In some implementations, the authentication indicator may indicate that mobile device 205 is not permitted to access network 260 (e.g., because mobile device 205 has been lost or stolen). In this case, EIR 255 may store information indicating that mobile device 205 is on a black list. Additionally, or alternatively, the authentication indicator may indicate that mobile device 205 is not permitted to access one or more services (e.g., a VoIP service, an SMS service, a cloud-based messaging service, or the like) provided by a network operator (e.g., a telecommunications service provider associated with a cellular network). In this case, EIR 255 may store information indicating that mobile device 205 is on a black list for the one or more services. This may be done to prevent mobile device 205 from accessing the one or more services (e.g., if mobile device 205 has abused a service, has not paid a bill relating to a service, is not subscribed to a service, or the like).

Additionally, or alternatively, the authentication information may indicate that mobile device 205 is permitted to access network 260. In this case, EIR 255 may store information indicating that mobile device 205 on a white list. In some implementations, EIR 255 may store information indicating that mobile device 205 is on the white list because mobile device 205 is trusted (e.g., associated with a trusted user, or the like). Additionally, or alternatively, the authentication indicator may indicate that mobile device 205 is permitted to access a particular service provided by the network operator. In this case, EIR 255 may store information indicating that mobile device 205 is on a white list for the particular service. This may be done to permit mobile device 205 to access the particular service (e.g., if mobile device 205 is subscribed to a service, or the like).

In some implementations, the authentication indicator may indicate that mobile device 205 is permitted or denied access to one or more services, and that a device is to collect information related to activity of mobile device 205. In this case, EIR 255 may store information indicating that mobile device 205 is on a grey list. In some implementations, EIR 255 may store information indicating that mobile device 205 is on the grey list if mobile device 205 is not trusted (e.g., if mobile device 205 is associated with suspicious activity, if mobile device 205 is a newly activated device, if mobile device 205 is unknown to network operator associated with the LTE network, or the like).

In some implementations, the authentication indicator may indicate that mobile device 205 is permitted to access one or more services, and denied access to one or more other services. Additionally, or alternatively, the authentication indicator may indicate that mobile device 205 is permitted to access an emergency service (e.g., E911 or a similar service). In this way, the network operator may permit mobile device 205 to access network 260 and/or to access services provided by the network operator. In some implementations, the authentication indicator may indicate, by default, that mobile device 205 is permitted to access an emergency service. Additionally, or alternatively, the authentication indicator may indicate, by default, that mobile device 205 is on a white list, a grey list, and/or a black list, for one or more services and/or network 260.

In some implementations, EIR 255 may receive authentication information, associated with mobile device 205, and generate an authentication indicator related to mobile device 205. The authentication information may include information indicating whether mobile device 205 is lost or stolen, whether mobile device 205 is trusted, and/or whether mobile device 205 is suspicious and/or unknown. In some implementations, the authentication indicator may indicate whether to permit access, deny access, and/or gather information regarding access to a network (e.g., a core network, network 260, or the like). Additionally, or alternatively, the authentication indicator may indicate whether to permit access, deny access, and/or gather information regarding access to a service (e.g., a VoIP service, a cloud-based messaging service, or the like). For example, assume that the authentication information indicates that mobile device 205 has been stolen. In this example, EIR 255 may generate an authentication indicator, indicating that mobile device 205 is on the black list.

As further shown in FIG. 4, process 400 may include storing the mobile device identifier and the authentication indicator (block 430). For example, EIR 255 may store the mobile device identifier and the authentication indicator in a data structure. EIR 255 may associate the mobile device identifier and the authentication indicator. In some implementations, EIR 255 may store the mobile device identifier and the authentication indicator locally or remotely. In this way, when mobile device 205 attempts to access a service via access network 210, EIR 255 may use the mobile device identifier to identify the authentication indicator. In some implementations, the mobile device identifier may be used to identify mobile device 205 on cellular access network 210-1. EIR 255, or another device, may use the mobile device identifier to identify mobile device 205 on WiFi access network 210-2, to permit or deny mobile device 205 access to the service via WiFi access network 210-2. In this way, the network operator may permit or deny access by mobile device 205 across multiple, different types of access networks 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
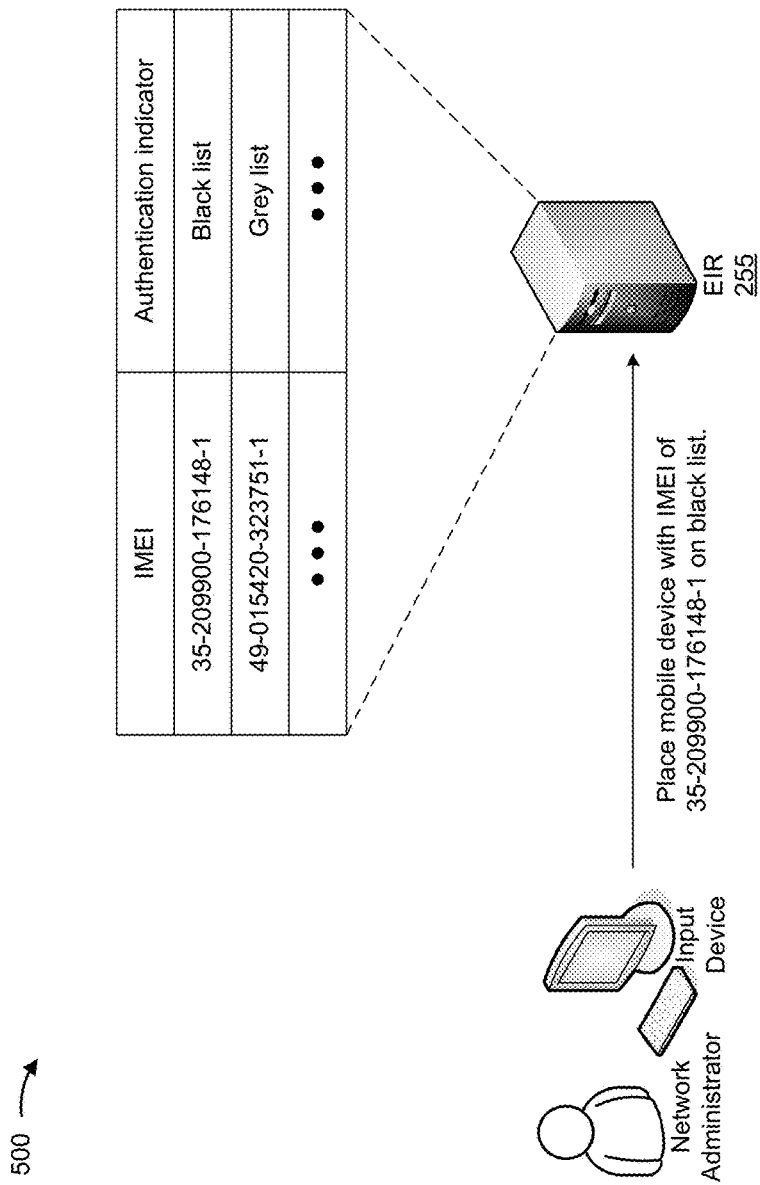
FIG. 5 is a diagram of an example implementation relating to the example process shown in FIG. 4.

FIG. 5 is a diagram of an example implementation 500 relating to example process 400 shown in FIG. 4. FIG. 5 shows an example of receiving and storing a mobile device identifier and an authentication identifier.

For the purpose of FIG. 5, assume that a mobile device, associated with an IMEI of 35-209900-176148-1, has been stolen. Assume further that a network administrator has been informed that the mobile device has been stolen. As shown, the network administrator may use an input device to provide the IMEI and the authentication indicator (e.g., indicating that the IMEI is a black listed IMEI) to EIR 255. EIR 255 may receive the IMEI and the authentication indicator. EIR 255 may store the IMEI and the authentication indicator. In this way, the network operator may prevent a lost or stolen mobile device 205 from using a network and/or a service.

As indicated above, FIG. 5 is provided merely as an example. Other examples are possible and may differ from what was described with regard to FIG. 5.

Figure 6:
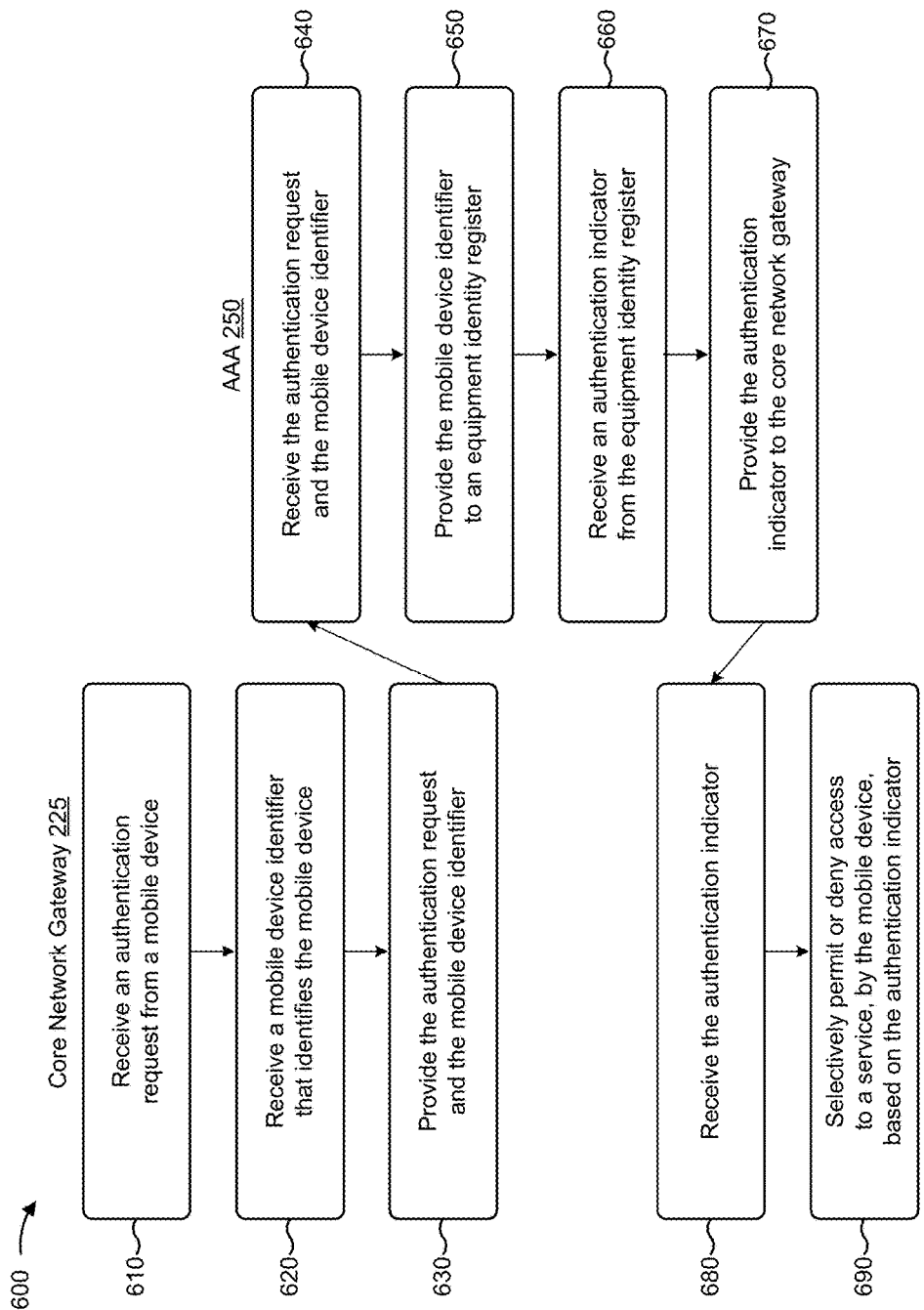
FIG. 6 is a flow chart of an example process for permitting or denying access to a service based on an authentication indicator.

FIG. 6 is a flow chart of an example process 600 for permitting or denying access to a service based on an authentication indicator. In some implementations, one or more process blocks of FIG. 6 may be performed by core network gateway 225 and/or AAA 250. In some implementations, one or more process blocks of FIG. 6 may be performed by another device or a group of devices separate from or including core network gateway 225 and/or AAA 250, such as base station 215, wireless access device 220, MME 230, SGW 235, PGW 240, HSS 245, and/or EIR 255.

As shown in FIG. 6, process 600 may include receiving an authentication request from a mobile device (block 610). For example, mobile device 210 may provide, via wireless access device 220, an authentication request to core network gateway 225. In some implementations, the authentication request may include a request to access a service provided by a network operator. In some implementations, the authentication request may include the mobile device identifier and/or information that identifies the service that mobile device 205 is attempting to access. In some implementations, mobile device 205 may provide the authentication request in connection with an attempt to access an emergency service (e.g., an E911 service). Core network gateway 225 may receive the authentication request via wireless access device 220.

As further shown in FIG. 6, process 600 may include receiving a mobile device identifier that identifies the mobile device (block 620). For example, mobile device 205 may provide the mobile device identifier that identifies mobile device 205. Core network gateway 225 may receive the mobile device identifier (e.g., via wireless access device 220). In some implementations, core network gateway 225 may receive the mobile device identifier with the authentication request. For example, the mobile device identifier may be included in the authentication request. Additionally, or alternatively, core network gateway 225 may request the mobile device identifier based on, or as a result of, receiving the authentication request.

As further shown in FIG. 6, process 600 may include providing the authentication request and the mobile device identifier (block 630). For example, core network gateway 225, after receiving the authentication request and the mobile device identifier, may provide the authentication request and the mobile device identifier to AAA 250. In some implementations, the mobile device identifier may be included in the authentication request. Core network gateway 225 may request an instruction, from AAA 250, regarding whether to permit or deny access to a service via wireless access network 210-2, associated with core network gateway 225.

As further shown in FIG. 6, process 600 may include receiving the authentication request and the mobile device identifier (block 640). For example, AAA 250 may receive the authentication request and the mobile device identifier from a gateway device associated with access network 210 (e.g., an HRPD serving gateway (HSGW), core network gateway 225, PGW 240, or a similar gateway), via an interface (e.g., an S6a interface, an STa interface, an SWm interface, or a similar interface). The STa interface may include an interface used to communicate information related to authentication and mobile device identification, between the HSGW and AAA 250, via a CDMA network. The SWm interface may be an interface used to communicate information related to authentication, between a gateway and AAA 250, via an LTE network. In some implementations, the SWm interface may be modified to provide the authentication request and the mobile device identifier to AAA 250. Additionally, or alternatively, AAA 250 may receive the authentication request and the mobile device identifier from HSS 245 via an SWx interface. In some implementations, AAA 250 may associate the authentication request and the mobile device identifier. AAA 250 may store the authentication request and the associated mobile device identifier.

As further shown in FIG. 6, process 600 may include providing the mobile device identifier to an equipment identity register (block 650). For example, AAA 250 may provide the mobile device identifier to EIR 255. EIR 255 may receive the mobile device identifier, and may identify an authentication indicator associated with the mobile device identifier. EIR 255 may search a data structure, using the mobile device identifier, to identify the authentication indicator.

In some implementations, EIR 255 may determine that mobile device 205, associated with the mobile device identifier, is associated with an authentication indicator, indicating that mobile device 205 is on the white list with regard to one or more services. In this case, EIR 255 may provide the authentication indicator permitting mobile device 205 to access the one or more services.

Additionally, or alternatively, EIR 255 may determine that mobile device 205, associated with the mobile device identifier, is associated with an authentication indicator, indicating that mobile device 205 is on the grey list with regard to one or more services. In this case, EIR 255 may provide an authentication indicator permitting or denying mobile device 205 access to the service, and indicating that information related to mobile device 205 is to be collected. For example, assume that mobile device 205 is associated with suspicious activities. Assume further that EIR 255 has stored an authentication indicator, indicating mobile device 205 is on the grey list. EIR 255 may provide an authentication indicator permitting mobile device 205 access to a service (e.g., a cloud-based messaging system, or the like), and causing one or more devices to collect information related to mobile device 205 (e.g., base station 215, MME 230, HSS 245, AAA 250, or the like). For example, the authentication indicator may be used by AAA 250 to instruct the one or more devices to collect data usage information, associated with mobile device 205, when mobile device 205 is accessing the service. In this way, the network operator may provide or deny mobile device 205 access to a service, and may collect information related to mobile device 205, via multiple, different types of access networks 210.

In some implementations, EIR 255 may determine that mobile device 205, associated with the mobile device identifier, is associated with an authentication indicator, indicating that mobile device 205 is on the black list with regard to one or more services. EIR 255 may provide an authentication indicator denying the mobile device identifier access to the one or more services. For example, assume mobile device 205 is not subscribed to a cloud-based messaging service. Assume further that EIR 255 stores an authentication indicator, indicating that mobile device 205 is black listed with respect to the cloud based messaging service. EIR 255 may provide the authentication indicator, denying mobile device 205 access to the cloud-based messaging service. Based on the authentication indicator, AAA 250 may deny mobile device 205 access to the cloud-based messaging service.

In some implementations, EIR 255 may determine that mobile device 205, associated with the mobile device identifier, is attempting to access an emergency service (e.g., E911, or the like). In this case, EIR 255 may provide an authentication indicator permitting mobile device 205 to access the emergency service, regardless of whether the stored authentication indicator indicates that mobile device 205 is on the white list, the grey list, or the black list. In this way, a network operator may implement an authentication system to ensure mobile device 205 is capable of accessing the emergency service when communicating via different types of radio access networks (e.g., cellular access network 210-1, WiFi access network 210-2, etc.).

As further shown in FIG. 6, process 600 may include receiving an authentication indicator from the equipment identity register (block 660). For example, AAA 250 may receive the authentication indicator provided by EIR 255. In some implementations, AAA 250 may determine the mobile device identifier associated with the authentication indicator, so that AAA 250 may provide the mobile device identifier to one or more devices (e.g., network gateway device 225, MME 230, SGW 235, HSS 245, or the like).

In some implementations, AAA 250 may determine the authentication indicator without requesting the authentication indicator from EIR 255. For example, AAA 250 may store and/or associate the authentication indicator and the mobile device identifier. AAA 250 may determine the authentication indicator based on the association.

In some implementations, AAA 250 may receive a first authentication request from mobile device 205 to access a service, via cellular access network 210-1. AAA 250 may determine an authentication indicator based on the authentication request, and may store the authentication indicator. AAA 250 may permit or deny access to the service based on the authentication indicator. AAA 250 may subsequently receive a second authentication request from mobile device 205 to access the service, via WiFi access network 210-2. AAA 250 may use the stored authentication indicator to determine whether to permit or deny mobile device 205 access to the service. In some implementations, AAA 250 may delete a stored authentication indicator after a set time has elapsed. In this way, AAA 250 may conserve resources by reducing the number of requests to EIR 255.

As further shown in FIG. 6, process 600 may include providing the authentication indicator to the core network gateway (block 670). For example, AAA 250 may provide the authentication indicator to core network gateway 225 (and/or another device, such as HSS 245). Additionally, or alternatively, AAA 250 may provide the mobile device identifier, associated with the authentication indicator, to core network gateway 225. AAA 250 may instruct core network gateway 225 to permit or deny access, by mobile device 205 associated with the mobile device identifier, to a service, based on the authentication indicator. In this way, the network operator may permit or deny mobile device 205 to access services on WiFi access network 210-2 associated with core network gateway 225 and/or wireless access device 220.

As further shown in FIG. 6, process 600 may include receiving the authentication indicator (block 680). For example, core network gateway 225 (and/or another device, such as HSS 245) may receive the authentication indicator provided by AAA 250. The authentication indicator may instruct core network gateway 225 to permit or deny access to network 260 and/or a service, and may instruct core network gateway 225 and/or another device to gather information related to activity of mobile device 205.

As further shown in FIG. 6, process 600 may include selectively permitting or denying access to a service, by the mobile device, based on the authentication indicator (block 690). For example, core network gateway 225 may receive an authentication indicator that indicates that mobile device 205 is permitted to access network 260 (e.g., that mobile device 205 is on the white list). In this case, core network gateway 225 may permit mobile device 205 to access network 260 via access network 210 based on the authentication indicator. Additionally, or alternatively, core network gateway 225 may receive an authentication indicator that indicates that mobile device 205 is permitted to access a first service (e.g., VoIP calling), but denied to access a second service (e.g., a cloud-based messaging service). In this case, core network gateway 225 may permit mobile device 205 to access the first service via access network 210, but may deny mobile device 205 access to the second service via access network 210, based on the authentication indicator. In some implementations, mobile device 205 may attempt to access an emergency service (e.g., an E911 service). In this case, core network gateway 225 may receive an authentication indicator that indicates that mobile device 205 is permitted to access the emergency service. Core network gateway 225 may permit mobile device 205 to access the emergency service based on the authentication indicator.

Additionally, or alternatively, core network gateway 225 may receive an authentication indicator that indicates that mobile device 205 is permitted to access network 260 and/or one or more services, but is subject to information collection (e.g., that mobile device 205 is on the grey list). In this case, core network gateway 225 may permit mobile device 205 to access network 260 and/or one or more services. In some implementations, core network gateway 225 may collect information related to mobile device 205. Additionally, or alternatively, core network gateway 225 and/or AAA 250 may instruct one or more other devices to collect information related to mobile device 205. In some implementations, the information collected may include information related to a location, data usage, active software programs, outgoing and/or incoming calls and/or messages, power usage, diagnostic information, and/or other similar information. In this way, the network operator may track suspicious usage of mobile device 205, and/or may determine the location of mobile device 205.

Additionally, or alternatively, core network gateway 225 may receive an authentication indicator that indicates that mobile device 205 is denied access to a network and/or a service (e.g., that mobile device 205 is on the black list). Core network gateway 225 may deny mobile device 205 from accessing network 260 via WiFi access network 210-2 based on the authentication indicator. For example, assume that mobile device 205 is stolen. Assume further that a network operator transmits an authentication indicator to EIR 255, indicating that the mobile device identifier associated with mobile device 205 is black listed. Assume that mobile device 205 subsequently provides an authentication request to EIR 255. EIR 255 may provide, to core network gateway 225, an authentication indicator indicating that mobile device 205 is on the black list. After receiving the authentication indicator, core network gateway 225 may deny mobile device 205 access to network 260. In some implementations, core network gateway 225 and/or AAA 250 may instruct one or more other devices to deny mobile device 205 access to network 260. In this way, a network operator may prevent a lost or stolen phone from accessing network 260 via WiFi access network 210-2.

In some implementations, AAA 250 may use the mobile device identifier associated with mobile device 205 to permit or deny access to a service on cellular access network 210-1. AAA 250, or another device, may use the mobile device identifier to identify mobile device 205 on WiFi access network 210-2, to permit or deny mobile device 205 access to the service via the WiFi access network 210-2. In this way, the network operator may permit or deny access by mobile device 205 across multiple, different types of access networks 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
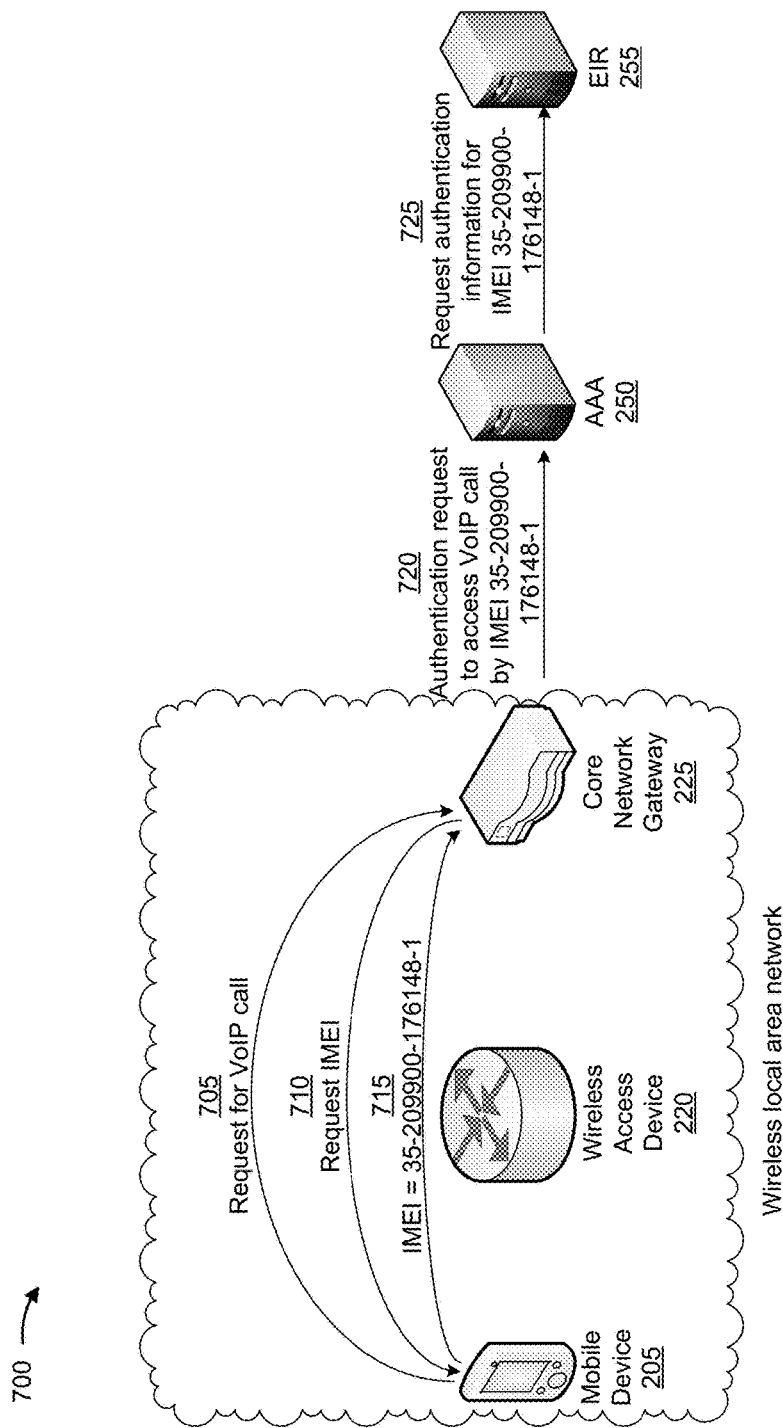
FIGS. 7A-7C are diagrams of an example implementation relating to the example process shown in FIG. 6.
Figure 7B:
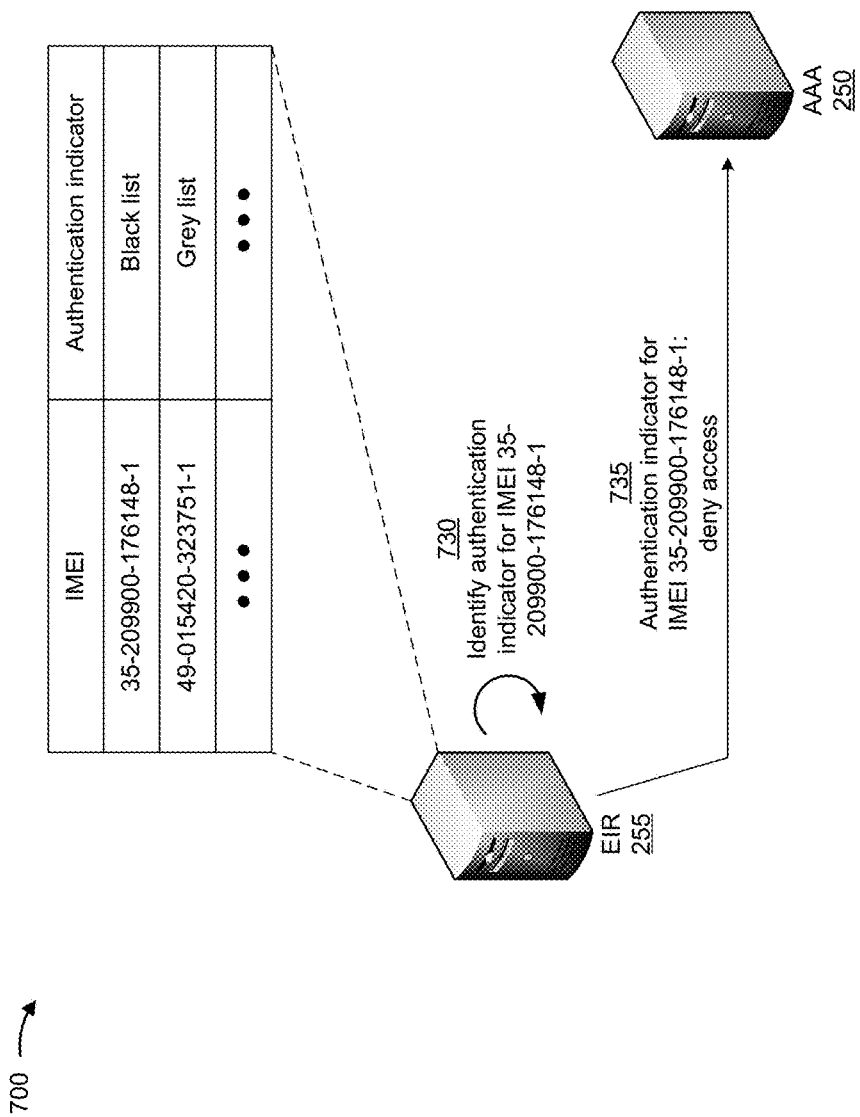
Figure 7C:
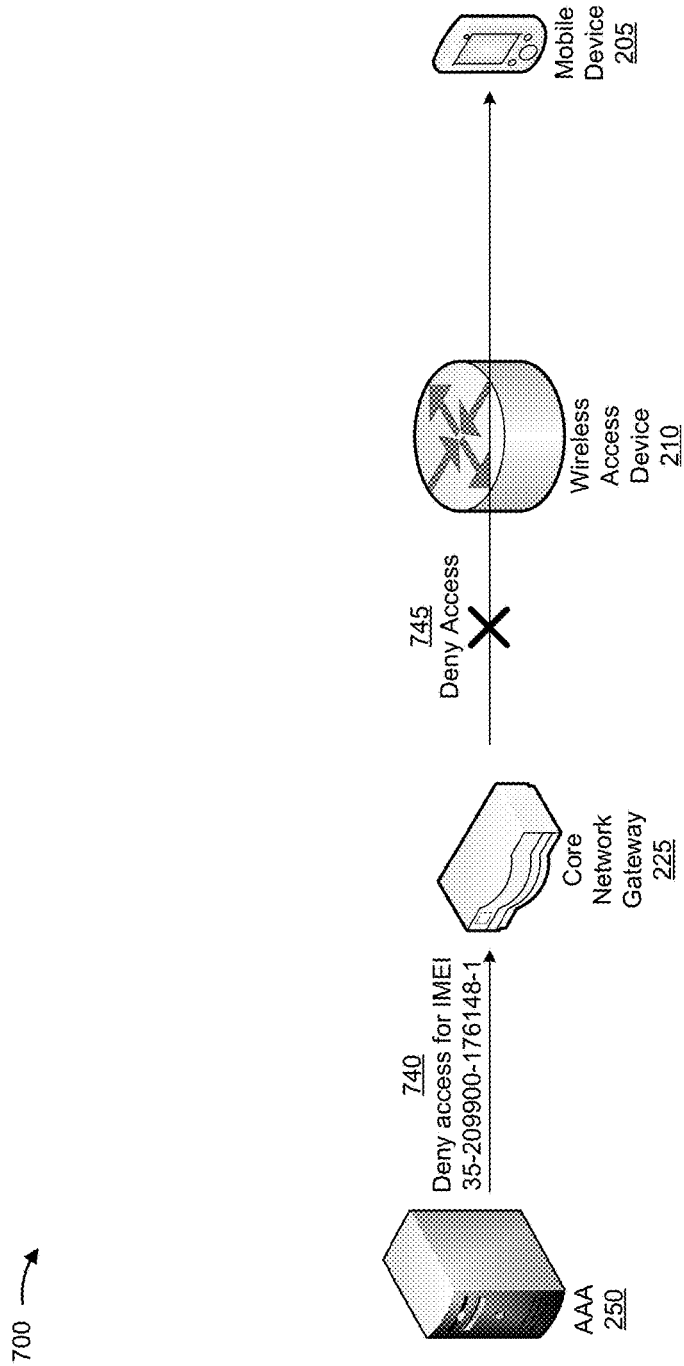

FIGS. 7A-7C are diagrams of an example implementation 700 relating to example process 600 shown in FIG. 6. FIGS. 7A-7C show an example of permitting or denying access to a service based on an authentication indicator. For the purpose of FIGS. 7A-7C, assume that the operations described herein in connection with FIG. 5 have already been performed. For example, assume that EIR 255 has previously stored an authentication indicator, indicating that IMEI 35-209900-176148-1 is on the black list. Assume further that being placed on the black list denies access to the network, and to all services, including VoIP. Assume that wireless access device 220 and core network gateway 225 are connected to the core network via a wireless local area network (e.g., a WiFi network.)

As shown in FIG. 7A, assume that mobile device 205 is attempting to access a service via wireless access device 220. As shown by reference number 705, mobile device 205 may provide an authentication request to access a VoIP call service, via wireless access device 220. As shown by reference number 710, core network gateway 225 may receive the authentication request, and may request an IMEI from mobile device 205, via wireless access device 220. As shown by reference number 715, mobile device 205 may provide the IMEI associated with mobile device 205 (here, 35-209900-176148-1) to core network gateway 225, via wireless access device 220.

As shown by reference number 720, core network gateway 225 may provide the authentication request (e.g., the request for the VoIP call service), and the IMEI (e.g., 35-209900-176148-1), to AAA 250. As shown by reference number 725, AAA 250 may request an authentication indicator for IMEI 35-209900-176148-1 from EIR 255.

As shown in FIG. 7B, and by reference number 730, EIR 255 may identify an authentication indicator for the IMEI, based on the authentication indicator stored by EIR 255. As shown in reference number 735, EIR 255 may provide the authentication indicator to AAA 250. The authentication indicator may indicate that mobile device 205 is to be denied access to the service.

As shown in FIG. 7C and by reference number 740, AAA 250 may provide an instruction, to core network gateway 225, to deny access by mobile device 205, associated with the IMEI, to the service. As shown in reference number 745, core network gateway 225 may send a message, to mobile device 205, informing mobile device 205, that mobile device 205 has been denied access to the network, including the VoIP service.

As indicated above, FIGS. 7A-7C are provided merely as an example. Other examples are possible and may differ from what was described with regard to FIGS. 7A-7C.

In this way, the network operator may permit or deny access to a service by a mobile device. The network operator may ensure that access to the service is permitted or denied across multiple radio access networks, including cellular access networks (e.g., 3G, 4G, and LTE networks), local area networks, and wireless local area networks (e.g., WiFi networks). Further, the network operator may ensure that certain features, such as E911 calling, are implemented across multiple radio access networks, including radio access networks (e.g., 3G, 4G, and LTE networks), local area networks, and wireless local area networks (e.g., WiFi networks).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive, from a mobile device and via first radio access network, a first authentication request for a first service;
   determine a first authentication indicator that indicates whether to permit or deny access to the first service based on receiving the first authentication request;
   store the first authentication indicator;
   receive, from the mobile device and via a second radio access network, a second authentication request for a second service,
     the second authentication request being received after the first authentication request;
   receive, via the second radio access network, a mobile device identifier that identifies the mobile device on the second radio access network,
     the second radio access network being a different type of radio access network than the first radio access network;
   determine, based on the first authentication indicator, a second authentication indicator that indicates whether to permit or deny access to the second service by the mobile device and via the second radio access network,
     the second authentication indicator indicating that the mobile device is associated with a white list, a grey list, or a black list; and
   selectively permit or deny the mobile device access to the second service, via the second radio access network, based on the second authentication indicator.

2. The device of claim 1, where the mobile device identifier is included in the second authentication request for the second service.

3. The device of claim 1,
   where the second radio access network includes a WiFi network; and
   where the first radio access network includes a cellular network.

4. The device of claim 1,
   where the mobile device identity is an international mobile station equipment identity used to identify the mobile device on the first radio access network; and
   where the second radio access network includes a WiFi network.

5. The device of claim 1,
   where the one or more processors, when receiving the second authentication request, are to:
     receive the second authentication request via an SWm interface,
       the SWm interface being configured to provide the second authentication request to the device; and
   where the one or more processors, when receiving the mobile device identifier, are to:
     receive the mobile device identifier via the SWm interface,
       the SWm interface being configured to provide the mobile device identifier to the device.

6. The device of claim 1,
   where the one or more processors, when receiving the second authentication request, are to:
     receive, from the mobile device and via the second radio access network, a request for an E911 service; and
   where the one or more processors, when selectively permitting or denying access to the second service, are to:
     permit the mobile device to access the E911 service via the second radio access network.

7. The device of claim 1,
   where the second authentication indicator indicates that the mobile device is to be denied access to a network,
     the second authentication indicator indicating that the mobile device is associated with the black list, and
     the black list identifying mobile devices that have been reported lost or stolen; and
   where the one or more processors, when selectively permitting or denying the mobile device access to the second service, are to:
     deny the mobile device access to the network, via the second radio access network, based on the second authentication indicator.

8. A non-transitory computer-readable medium storing instructions, the instructions comprising:
   one or more instructions that, when executed by one or more processors, cause the one or more processors to:

receive, from a mobile device and via a first radio access network, a first authentication request for a first service;
determine a first authentication indicator that indicates whether to permit or deny access to the first service based on receiving the first authentication request;
store the first authentication indicator;
receive, from the mobile device and via a second radio access network, a second authentication request for a second service,
the second authentication request being received after the first authentication request;
receive, via the second radio access network, a mobile device identifier that identifies the mobile device on the second radio access network,
the second radio access network being a different type of radio access network than the first radio access network;
determine, based on the first authentication indicator, a second authentication indicator that indicates whether to permit or deny access to the second service by the mobile device, and via the second radio access network,
the second authentication indicator indicating that the mobile device is associated with a white list, a grey list, or a black list; and
selectively permit or deny the mobile device access to the second service via the second radio access network, based on the second authentication indicator.

9. The non-transitory computer-readable medium of claim 8,
where the one or more instructions, that cause the one or more processors to receive the second authentication request, cause the one or more processors to:
receive, from the mobile device and via the second radio access network, a request for an E911 service; and
where the one or more instructions, that cause the one or more processors to selectively permit or deny the mobile device access to the second service, cause the one or more processors to:
permit the mobile device to access the E911 service via the second radio access network.

10. The non-transitory computer-readable medium of claim 8,
where the second authentication indicator indicates that the mobile device is associated with the grey list,
the grey list identifying mobile devices that are subject to information collection, and
the information collection relating to activity of the mobile device; and
where the one or more instructions, that cause the one or more processors to selectively permit or deny the mobile device access to the second service via the second radio access network, cause the one or more processors to:
permit the mobile device to access the second service via the second radio access network, and
cause information to be collected relating to the activity of the mobile device, based on the second authentication indicator.

11. The non-transitory computer-readable medium of claim 8,
where the second authentication indicator indicates that the mobile device is associated with the white list,
the white list identifying mobile devices that are permitted to access the second radio access network; and
where the one or more instructions, that cause the one or more processors to selectively permit or deny the mobile device access to the second service via the second radio access network, cause the one or more processors to:
permit the mobile device to access the second service via the second radio access network, based on the second authentication indicator.

12. The non-transitory computer-readable medium of claim 8, where the one or more instructions, that cause the one or more processors to receive the mobile device identifier, cause the one or more processors to:
receive, via the second radio access network, an international mobile station equipment identity that identifies the mobile device.

13. The non-transitory computer-readable medium of claim 8, where the one or more instructions, that cause the one or more processors to receive the mobile device identifier, cause the one or more processors to:
receive the mobile device identifier via a gateway that provides access to the second radio access network,
the second radio access network including a wireless local area network.

14. A method, comprising:
receiving, by a device and via first radio access network, a first authentication request, for a first service, from a mobile device;
determining, by the device, a first authentication indicator that indicates whether to permit or deny access to the first service based on receiving the first authentication request;
storing, by the device, the first authentication indicator;
receiving, from the mobile device and via a second radio access network, a second authentication request for a second service,
the second authentication request being received after the first authentication request;
receiving, by the device and via the second radio access network, a mobile device identifier that identifies the mobile device on the second radio access network,
the second radio access network being a different type of radio access network than the first radio access network;
determining, by the device and based on the first authentication indicator, a second authentication indicator that indicates whether to permit or deny access to the second service by the mobile device and via the second radio access network,
the second authentication indicator indicating that the mobile device is associated with a white list, a grey list, or a black list; and
selectively, by the device, permitting or denying the mobile device access to the second service via the second radio access network, based on the second authentication indicator.

15. The method of claim 14, where determining the second authentication indicator comprises:
providing the mobile device identifier to an equipment identity register,
the equipment identity register associating mobile device identifiers with authentication indicators; and
receiving, from the equipment identity register, the authentication indicator.

16. The method of claim 14, where the second radio access network includes a wireless local area network.

17. The method of claim 14, where the first radio access network includes a cellular network.

18. The method of claim 14,
where receiving the second authentication request comprises:
receiving, from the mobile device and via the second radio access network, a request for an E911 service; and
determining that the second authentication request is for the E911 service; and
where selectively permitting or denying the mobile device access to the second service comprises:
permitting the mobile device to access the E911 service, via the second radio access network, based on determining that the second authentication request is for the E911 service.

19. The non-transitory computer-readable medium of claim 8,
where the second authentication indicator indicates that the mobile device is associated with the black list, the black list identifying mobile devices that are denied access to the second radio access network; and
where the one or more instructions, that cause the one or more processors to selectively permit or deny the mobile device access to the second service, cause the one or more processors to:
deny the mobile device to access the second service via the second radio access network, based on the second authentication indicator.

20. The method of claim 14, where selectively permitting or denying the mobile device access to the second service comprises:
permitting the mobile device to access the second service when the second authentication indicator indicates that the mobile device is associated with the white list;
denying the mobile device access to the second service when the second authentication indicator indicates that the mobile device is associated with the black list; and
permitting the mobile device to access the second service subject to an information collection when the second authentication indicator indicates that the mobile device is associated with the grey list.

\* \* \* \* \*